No. 752,542. Patented February 16, 1904.

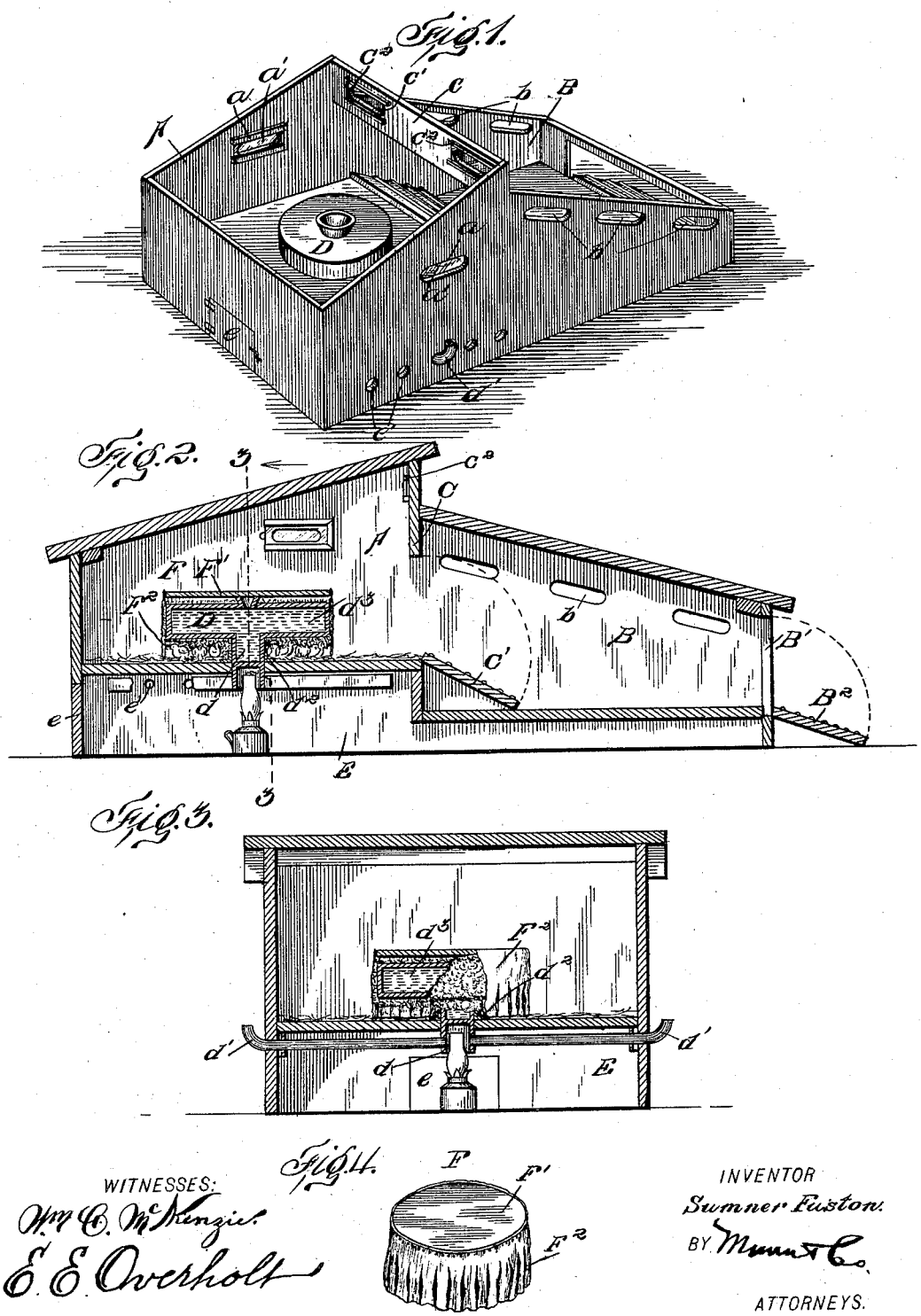

UNITED STATES PATENT OFFICE.

SUMNER FUSTON, OF MURFREESBORO, TENNESSEE.

BROODER.

SPECIFICATION forming part of Letters Patent No. 752,542, dated February 16, 1904.

Application filed June 24, 1903. Serial No. 162,835. (No model.)

*To all whom it may concern:*

Be it known that I, SUMNER FUSTON, a citizen of the United States, and a resident of Murfreesboro, in the county of Rutherford and State of Tennessee, have made certain new and useful Improvements in Brooders, of which the following is a specification.

My object is to provide a brooder adapted for a plentiful supply of fresh air and having a heater so constructed and located that the chicks are warmed by coming in contact therewith.

A further object is to obtain these desirable results with a minimum expenditure of oil.

A still further object is to construct the brooder-casing in two compartments, one lower than the other, and with a door hinged at its lower end, so it can be turned down to form an inclined runway from the upper to the lower compartment or can be turned up to form a separating-wall between the two compartments.

The invention consists in certain novel features of construction and arrangement of parts, which will now be described and claimed, reference being had to the accompanying drawings, in which—

Figure 1 is a perspective view of my brooder complete, with the top covers thereof removed. Fig. 2 is a central longitudinal section of my device. Fig. 3 is a transverse section on the line 3 3 of Fig. 2, and Fig. 4 is a perspective view of a removable hover to be used with the heater of my brooder.

Referring to the drawings, the brooder is divided into two compartments A and B, separated from each other by the partitions C, the lower part of which is formed into a door $C'$, hinged at its lower edge to open downwardly when it is desired to throw the two compartments together, and thus form a runway from the upper to the lower compartment. The compartment B is also provided in its end wall $B'$ with a door $B^2$, also hinged at its lower side to open downwardly and outwardly. The compartment A contains the heater D, and the floor of this compartment is elevated somewhat above the floor of the compartment B to make room underneath the former for the lamp, while the floor of the compartment B is usually elevated somewhat above the ground upon which the brooder stands. The floors being arranged thus, the doors $C'$ and $B^2$ form inclined runways over which the chicks can readily pass in going in and out of the brooder or from one compartment thereof to the other. The compartment A has in its side walls the openings $a$ for ventilation, and these openings are provided with glass slides $a'$ for closing the openings in severe weather. The compartment B is also provided with ventilator-openings $b$, which are never closed. The upper portion of the wall or partition C opening into the outer air is also provided with ventilator-openings $C'$, having glass slides $C^2$.

The chamber E of my device, located underneath the floor of the compartment A, is provided for the lamp and has a small door $e$, through which the lamp is entered to its operative position underneath the heater D. The construction and arrangement of the heater with reference to the floor constitutes an important feature of my invention. It may be located in any part of the compartment A of the brooder and may be of the ordinary circular construction shown in the drawings, or may be square or angular to fit into the corners of the compartment, or of any other desired shape whatsoever.

As shown in Figs. 2 and 3 of the drawings, my heater is provided with the central tubular portion $d$, which extends downwardly through the floor of the compartment A of the brooder over the top of the lamp-chimney. In order to convey away all the gases, &c., from the lamp, I provide this section $d$ of my heater with the branch pipes $d'$, which extend outwardly through the side walls of the brooder into the open air, as illustrated in Fig. 3. In order to obtain a better circulation through these branch pipes, their outer ends are turned upwardly. By this construction I discharge the products of combustion directly from the lamp-chamber.

The tubular section $d$ of my heater is provided near its upper end with a collar carrying an annular flange $d^2$, which rests upon the floor, and thereby supports the heater in its operative position, with the under side of its drum-section $d^3$ only a short distance above the floor, so that when the chicks run under the heater they can bear up against its under side with their backs in very much the same way that they do under a hen, and thereby get warmed by actual contact with the heater rather than from breathing or being shut up in a close overheated atmosphere, which latter is the occasion of most of the diseases incident to the raising of young chickens in brooders. The air or water in the heater is only kept at a sufficient temperature to impart the requisite amount of warmth to the chicks when in contact therewith just as they are warmed by a hen, and due to the abundant ventilation of the brooder the surrounding atmosphere is always at a much lower temperature and is fresh and pure.

The outer surface of my heater is padded over with asbestos, cloth, wool, or other soft non-conducting material, so that the chicks will have a soft body to bear up against and embed themselves into while breathing the fresh cool air in much the same way that they do when covered by a hen, with their heads sticking out through the feathers.

The floor of my brooder is also reasonably cool and is never very warm, since the compartment E, containing the lamp, has besides the branch pipes $d'$ the ventilator-openings $e'$ for the heat of the lamp to escape through. The floor of the brooder is usually covered with an abundant supply of chopped straw, hay, clover, or the like, and the portion of this material underneath the drum $d^3$ will eventually become very warm, so that when the chicks creep under the drum, with the padding of the drum above them and the chopped material underneath them, they are practically surrounded with soft yielding material thoroughly warmed. When the chicks are first hatched, a sufficient quantity of this material is placed underneath the drum to bring them up into contact with the under side thereof, and as they grow larger the quantity is reduced.

The hover F of my device is composed of a wooden top F', somewhat larger in diameter than the drum and surrounded with heavy curtains $F^2$ or the like provided with numerous vertical slits, as clearly shown in Fig. 4. This hover is placed over the drum like a box-lid with the curtains hanging down about the floor.

So far as I am aware all the brooder-heaters now on the market depend upon radiation for warming the chicks—that is, the compartments in which the chicks are housed are made very warm by heat thrown off from the drum into the atmosphere of the compartment, and the chick is warmed by being exposed to the action of this overheated atmosphere and by breathing the same, very largely by the latter; but breathing close hot air is very injurious to chicks, so much so that all poultrymen agree that chicks cannot be successfully raised during the hot months, when the thermometer ranges from 90° to 100°. Hence the problem upon which success hinges is to thoroughly warm the body of the chick while at the same time giving him comparatively cool fresh air to breathe. This cannot be done by the old method, for if sufficient ventilation be provided to prevent the air within the brooder from becoming fetid the heat is carried off and the body of the chick is not kept sufficiently warm even when a large amount of oil has been consumed.

It will be seen that with my brooder the body of the chick is warmed by contact with the heater and that the surrounding air is always cool and fresh, since the glass slides in the compartment A are only closed in severe weather or storms, and the ventilator-openings in the compartment B are never closed, as already stated. Hence it will be seen that my device is operated with a minimum amount of oil, since I only provide sufficient heat to keep the drum $d^3$ well warmed, leaving the atmosphere within the brooder compartively cool.

Having thus described my invention, what I claim as new, and desire to secure by Letters Patent, is—

1. The improvement in brooders herein described, comprising the casing having two compartments, one higher than the other, and provided with a lamp-chamber below the higher compartment, the door hinged at its lower edge between the two compartments and adapted to be turned up to form a partition between the two compartments, or down to form an inclined runway from the upper to the lower compartment, offtake-flues leading laterally from the lamp-compartment, whereby the products of combustion can be discharged directly from said compartment, and a heater located in the upper compartment of the casing and having a portion extending at such height above the floor of said compartment as to form a heating-shelter beneath which the chicks may congregate and padded for contact by the said chicks, substantially as set forth.

2. A brooder having an upper and a lower compartment with an intervening floor between them, the upper compartment being for the chicks, a heating-lamp in the lower compartment, a heater having at its lower end a vertical tubular section extending down through the floor of the upper compartment into the lower chamber immediately over the lamp, the upper end of said tubular section extending up into the upper chamber a short distance above the floor, a horizontally-disposed drum at the upper end of said tubular section, said drum overreaching the floor and located adjacent thereto for the chicks to come in contact with, the outer surface of the drum and the upper portion of the tubular section adjacent thereto being covered with soft nonheat-conducting material, the lower end of the tubular section being provided with branch pipes leading outwardly therefrom into the open air, and turned upwardly at their outer ends, and means carried by said vertical tubular section for supporting said heater at a suitable elevation above said floor.

3. A brooder having a heating-lamp and a heater provided with a downwardly-extending tubular section located immediately above the heating-lamp, said tubular section having branch pipes extending outwardly and upwardly into the open air to carry off the gases from the lamp, a horizontally-disposed drum at the upper end of said tubular section, said drum overreaching the floor and located adjacent thereto for the chicks to come in contact with, the outer surface of the drum being covered with soft non-heat-conducting material.

4. A brooder having a heater with an overreaching drum located adjacent the floor of the brooder for the chicks to come in contact with and to bear upward against, the portion of the drum with which the chicks come in contact being covered with soft, non-conducting material.

5. A brooder having a heater provided with a portion for the chicks to come in contact with, said portion having its side with which the chicks come in contact covered with animal or vegetable wool.

6. A brooder having a heater provided with a portion for the chicks to come in contact with said portion having its side with which the chicks come in contact padded with soft, non-heat-conducting material.

7. A brooder having a heater provided with a portion for the chicks to come in contact with, said portion having its side with which the chicks come in contact covered with soft yielding material.

8. A brooder having its heater provided with a portion for the chicks to come in contact with, said portion having its sides with which the chicks come in contact padded.

9. A brooder having a heater extending at such height above the floor as to form a heating-shelter beneath which the chicks may congregate, said shelter to be engaged by the backs of the chicks and padded for contact by said chicks.

SUMNER FUSTON.

Witnesses:
 Jos. B. Palmer,
 W. W. Bell.